United States Patent [19]

Weishew

[11] 4,352,413
[45] Oct. 5, 1982

[54] AIR BRAKE

[76] Inventor: Joseph F. Weishew, 3934 Davisville Rd., Hatboro, Pa. 19040

[21] Appl. No.: 125,760

[22] Filed: Apr. 18, 1980

Related U.S. Application Data

[62] Division of Ser. No. 888,190, Mar. 20, 1978, Pat. No. 4,227,421.

[51] Int. Cl.³ .............................................. F16D 55/12
[52] U.S. Cl. .................................... 188/72.4; 188/366
[58] Field of Search ................... 188/71.5, 72.3, 72.4, 188/170, 366, 367

[56] References Cited

U.S. PATENT DOCUMENTS 3,500,970  3/1970  Schilling ........................ 188/72.3 X
3,680,666  8/1972  Sommer ............................. 188/170

Primary Examiner—Duane A. Reger
Attorney, Agent, or Firm—Robert J. Mooney

[57] ABSTRACT

An air brake includes a friction liner attached to a piston-like member which is arranged to reciprocate with respect to a stationary member. The piston-like member is urged into its inoperative position without the use of a biasing element such as a spring or spring-like member.

1 Claim, 5 Drawing Figures

AIR BRAKE

This is a division of application Ser. No. 888,190 filed Mar. 20, 1978, now U.S. Pat. No. 4,227,421.

BACKGROUND OF THE INVENTION

This invention is directed to a carriage reciprocator and positioner. This invention is related to a class of devices known as chain reciprocators.

Present day chain reciprocators have carriages connected directly to a chain. Reciprocation of the carriage is achieved by reversing the motion of the chain. Reversal of chain motion can have detrimental effects especially in those applications where high speed, short stroke carriage reciprocation is required. In such applications and others the chain life is shortened since the chain is required to take most of the inertial shock of carriage reversal. In addition, in high speed, short stroke reciprocation environments, one section of the chain tends to wear excessively which usually leads to differential wear of the sprocket teeth and resultant chain slap.

SUMMARY OF THE INVENTION

Accordingly, it is an object of this invention to provide a carriage reciprocator and positioner having a chain which continuously runs in one direction and wherein most of the inertial shock of carriage reversal is absorbed by the carriage. It is a further object of this invention to provide a device wherein all of the chain is used, wherein device longevity and reliability are increased, wherein the velocity of the carriage is controllable, wherein chain life is extended and wherein a unique arrangement of air clutches, chain sprockets and associated elements, are arranged to automatically achieve carriage reciprocation along an adjustable stroke length. These and other objects of the invention are achieved as follows.

A carriage is provided with two air clutches each of which controls a respective one of two carriage mounted chain sprockets. The carriage is arranged to move along two vertically spaced co-planar rails which are each separately attached to a housing. The housing supports a variable speed motor which is arranged to continuously drive an elongated roller chain around two spaced co-planar sprockets. The chain lies in a plane which is parallel to and situated between the carriage plane and the plane of the rails.

The continuously running roller chain presents one direction of chain motion to the top of the carriage and an opposite direction of chain motion to the bottom of the carriage. One of the carriage mounted sprockets engages the chain near the top of the carriage and the other carriage mounted sprocket engages the chain near the bottom of the carriage. Each of the carriage mounted sprockets is arranged to normally idle with chain motion and the carriage is then normally stationary. However, actuation of an air clutch prevents its associated sprocket from spinning with chain motion and effectively locks that sprocket and clutch to the chain. Since the clutch is secured to the carriage, the carriage will be carried along the rails by the chain in a linear direction which is dependent upon which portion of the chain was so engaged. The carriage will move in one direction until the then operative clutch is de-actuated and the other clutch is actuated whereupon the carriage reverses direction.

Automatic actuation and de-actuation of the two air clutches is achieved with the use of a four way, two position, pilot operated spool valve which is mounted on the carriage and which is provided with a suitable source of compressed air. Two control shafts extend from either side of the spool valve. Each of the control shafts is arranged to eventually contact a respective one of two shock absorbers which are each adjustably secured to the housing. The spool valve is arranged to actuate one clutch while simultaneously deactivating the other. When air is supplied to the spool valve it will assume one of two positions and actuate one of the two clutches. The carriage will move in a particular direction until one of the spool valve control shafts contacts one of the two shock absorbers. At the moment of contact the spool valve assumes its other position deactuating the then inoperative air clutch. In this manner carriage direction is automatically reversed and the carriage is caused to reciprocate between the two shock absorbers.

BRIEF DESCRIPTION OF THE DRAWINGS

FIG. 5 is a schematic diagram of the air clutches and a controlling spool valve, all of which are part of the device shown in FIGS. 1 and 2.

DESCRIPTION OF THE PREFERRED EMBODIMENT

Figure 1:
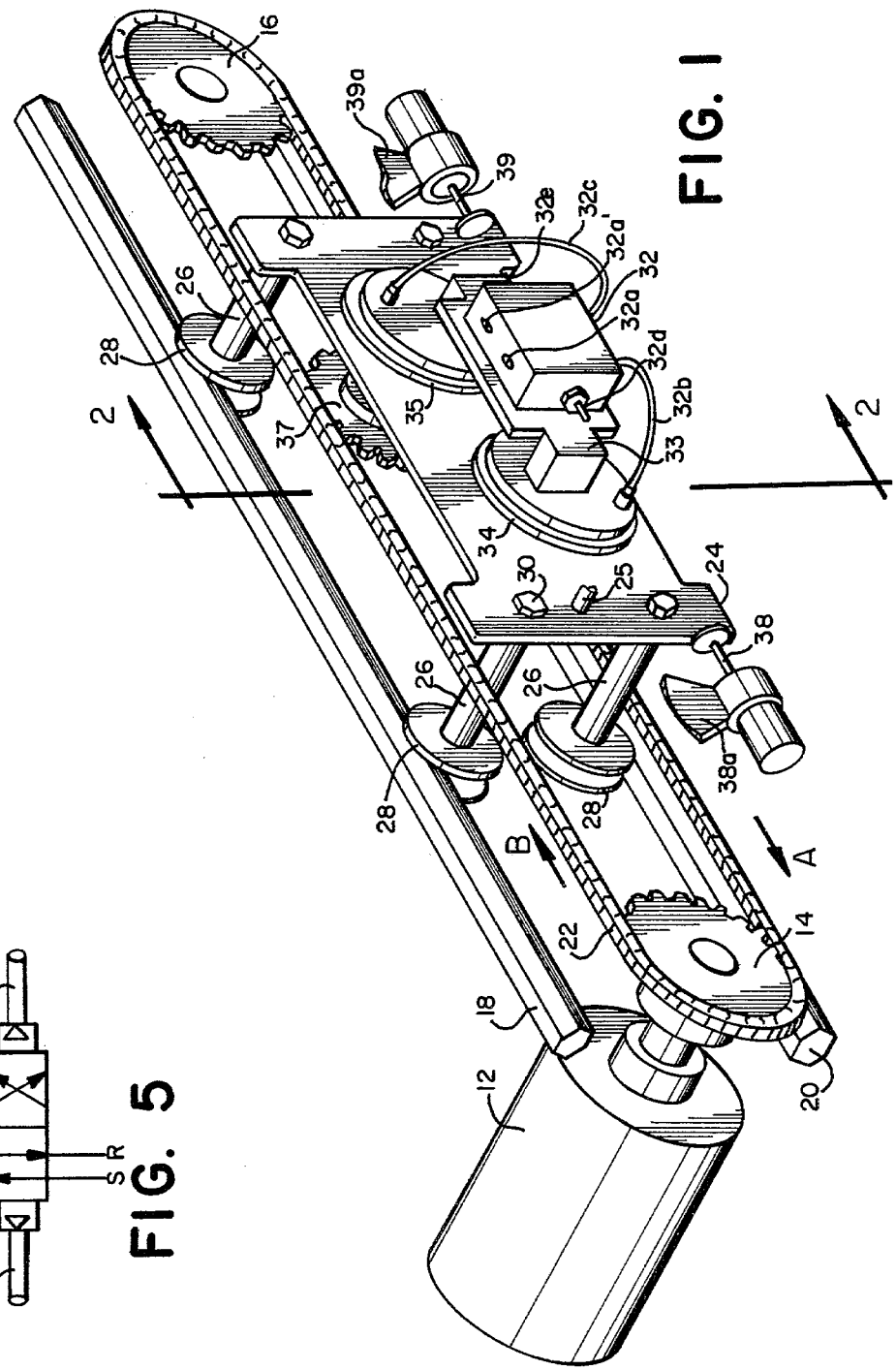
FIG. 1 is an isometric view of a carriage reciprocator and positioner according to this invention; for clarity of presentation a housing to which some of the elements are attached is not shown and certain dimensions have been exaggerated.

Referring to FIG. 1, the carriage reciprocator and positioner includes a conventional variable speed motor 12 which is conventionally arranged to turn a driven sprocket 14. An idler sprocket 16, spaced apart from, but in the same plane as, the driven sprocket 14, is also provided. A continuous roller chain 22 extends around and between the driven sprocket 14 and the idler sprocket 16. An upper rail 18 and a lower rail 20 are also provided. The rails 18, 20 have hexagonal cross sections. The rails 18, 20 lie in a plane parallel to but behind the plane in which the sprockets 14, 16 and chain 22 lie.

For clarity of presentation, the housing which supports the motor 12, idler sprocket 16 and rails 18, 20 is not shown in FIG. 1. However, it is to be understood that these elements are conventionally secured to such unshown housing.

A carriage 24 rides on and between the upper and lower rails 18, 20. Four parallel and spaced axles 26 project rearwardly from the carriage 24. The axles 26 are secured to the carriage 24 by any conventional means such as bolts 30. Each axle 26 is provided with a rotatable wheel 28. Two of the wheels 28 are arranged to move along the upper rail 18 and the other two wheels 28 are arranged to move along the lower rail 20.

The carriage 24 is provided with at least one support pin 25 which may be secured to the carriage in any suitable fashion and upon which any suitable element, such as a spray gun, may be supported.

Upon the carriage 24 are mounted a four way spool valve 32, two identical air clutches 34, 35 and two identical carriage chain sprockets 36 (one of which does not appear in FIG. 1). The spool valve 32 is secured to the carriage 24 with a standoff support 33.

With further reference to FIG. 1, the spool valve 32 is provided with an air inlet 32a and air outlet 32a'. Compressed air is fed to the inlet 32a from a controllable source (not shown) through a hose (not shown) of appropriate length. Each of two air control lines 32b, 32c extends from the spool valve 32 to a respective one of the two air clutches 34, 35. Each of two spool valve control shafts 32d, 32e extend from a respective side of the spool valve 32 in a plane parallel to the plane in which the chain 22 lies.

Each of two shock absorbers 38, 39 is adjustably set opposite a respective one of the two spool valve control shafts 32d, 32e. Each of the two shock absorbers 38, 39 is movably mounted on a housing (not shown) with a respective one of two support bars 38a, 39a. The distance between the shock absorbers 38, 39 is defined as the stroke of the carriage 24. The stroke may be made smaller or larger by adjusting the distance between the shock absorbers 38, 39. (As will be made clearer below, when one of the two air clutches 34, 35 is actuated, the carriage 24 will move in one direction until one of the two spool valve control shafts 32d, 32e contacts a respective one of the two shock absorbers 38, 39. At the moment of contact the spool valve 32 automatically deactivates the operative one of the two air clutches 34, 35 and actuates its counterpart. This action causes the carriage 24 to move in an opposite direction until the other one of the two spool valve control shafts 32d, 32e contacts the other one of the two shock absorbers 38, 39. In this manner, the carriage 24 is caused to reciprocate between the two shock absorbers 38, 39).

Figure 2:
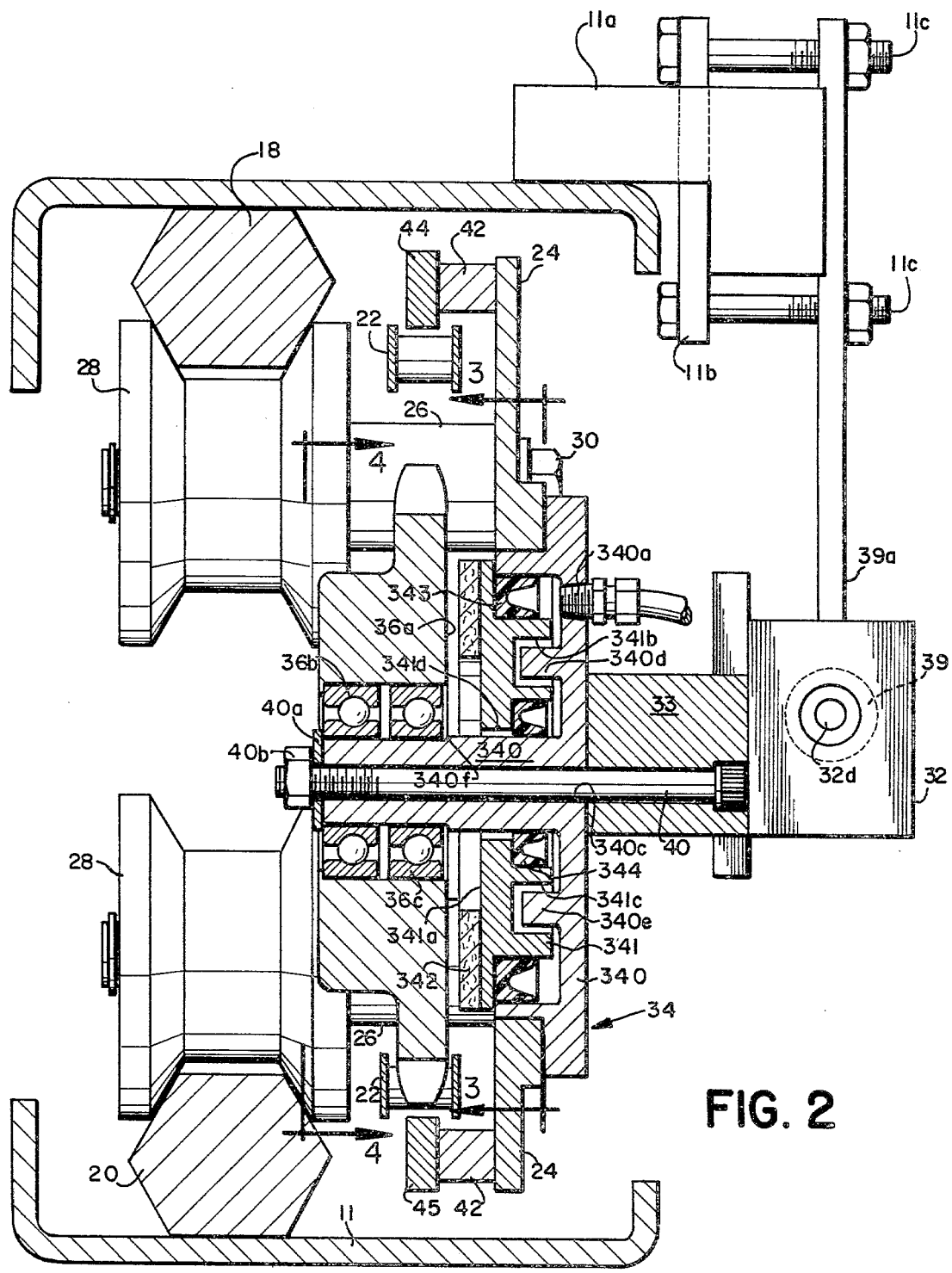
FIG. 2 is a partial cross-sectional view, taken along the lines 2—2, of the device shown in FIG. 1; this view highlights the configuration of an air clutch and associated carriage chain sprocket both of which are part of the device shown in FIG. 1.
Figure 3:
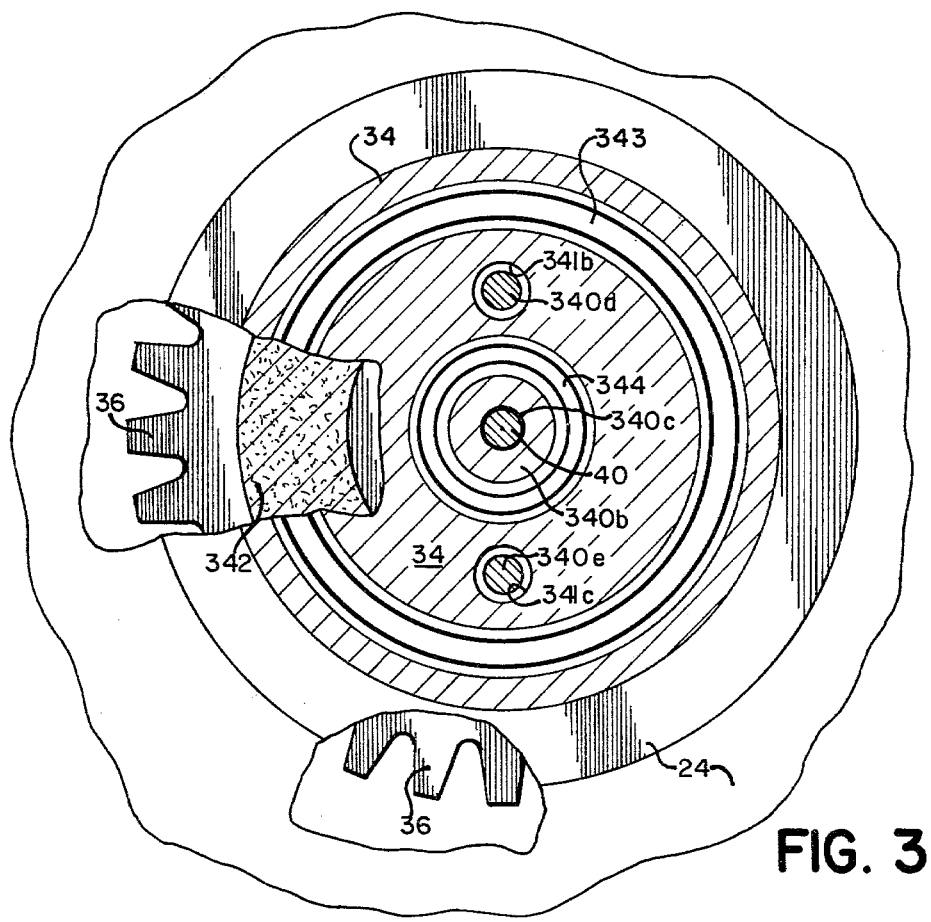
FIG. 3 is a plan view, partially sectioned of the air clutch shown in FIG. 2 and is taken along the line 3—3 in FIG. 2.

Referring to FIG. 2, which is a cross section, along the line 2—2, of the device shown in FIG. 1, a detailed view of one of the two identical air clutches 34, 35 and of one of the two identical carriage chain sprockets 36, 37 is shown.

The air clutch 34 includes three major elements: a clutch cylinder 340, which is stationary with respect to the carriage 24, a clutch piston 341 which is axially movable with respect to the clutch cylinder 340, and a friction liner 342 which is secured to the flat head 341a of the clutch piston 341.

The clutch cylinder 340 is substantially circular in shape and is rigidly secured to the carriage 24 by any suitable means (not shown). The clutch cylinder 340 is provided with an air inlet 340a which accommodates the air control line 32b. The clutch cylinder 340 is also provided with a centrally located, elongated, cylindrically shaped hub 340b which is flanked by two cylindrically shaped bosses 340d, 340e. The clutch piston 341 is also substantially circular in shape. One side, defined as the piston head 341a, faces a land 36a on the carriage chain sprocket 36; the other side is provided with two circular recesses 341b, 341c which flank a circular hole 341d which is concentric with the hub 340b of the clutch cylinder 340. Each of the two bosses 340d, 340e on the cylinder 340 normally repose within a respective one of the two recesses 341b, 341c in the piston 341. This arrangement prevents the piston 341 from rotating with respect to the cylinder 340 but allows the piston 341 to slide along the hub 340b of the cylinder 340.

The clutch piston also includes a disc shaped friction liner 342 which is secured to the piston head 341a by conventional means (not shown). Two cup shaped "O"-rings 343, 344 prevent air leakage as the piston 341 moves along the hub 340b.

Figure 4:
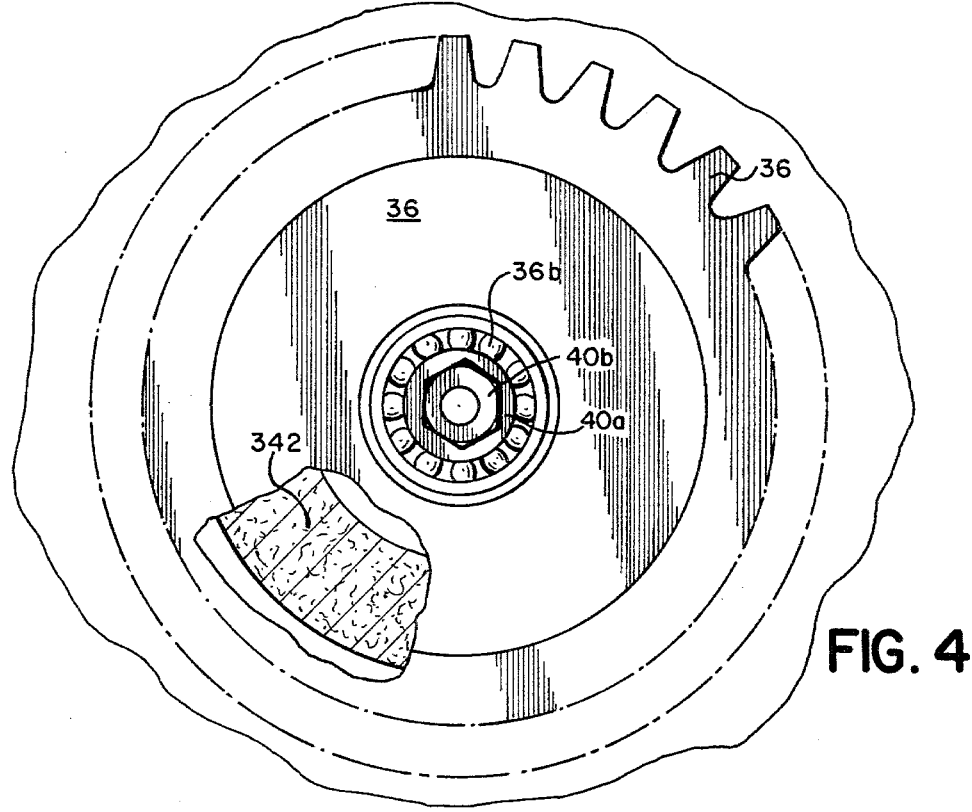
FIG. 4 is a plan view, partially sectioned, of the carriage chain sprocket shown in FIG. 2 and is taken along the line 4—4 in FIG. 2.

With further reference to FIG. 2, a detailed view of one of the carriage chain sprockets 36, 37 is also shown. The sprocket 36 is conventional in design and is arranged to normally rotate on a reduced diameter portion of the hub 340b. Two captured roller bearings 36b, 36c are provided. A threaded bolt 40, which extends from the valve support 33 and through the bore 340c in the hub 340b is provided with a washer 40a and a nut 40b. (See FIG. 4). The two bearings 36b, 36c repose between the washer 40a and the shoulder 340f of the reduced diameter portion of the hub 340b. This arrangement insures not only that the sprocket 36 freely rotates but also that a preferred distance is maintained between the land 36a of the sprocket 36 and the friction liner 342 when no compressed air is introduced into the inlet 340a.

FIG. 2 also shows part of the housing 11 in which all of the foregoing elements are lodged. The shock absorber support bar 39a is shown extending to a housing overhang 11a which extends the length of the housing and upon and along which the support bar 39a and its companion support bar 38a slide. Each of the two shock absorber support bars 38a, 39a may be removably secured to a selected portion of the overhang 11a by means of a clamp 11b and bolts 11c or in any other suitable manner.

With further reference to FIG. 2, the carriage 24 is also provided with four identical spacers 42 which project from the carriage 24 toward the chain 22. The top two of the spacers 42 support an upper chain guide rail 44 and the bottom two of the spacers 42 support a lower chain guide rail 45. Both chain guide rails 44, 45 extend the length of the carriage and insure proper registration of the chain 22 with each of the two carriage chain sprockets 36, 37.

In FIG. 5, a pneumatic diagram of the spool valve 32 and the clutches 34, 35 is presented. With the spool valve in the first position shown in FIG. 5, the lower clutch 34 is connected to a source, S, of compressed air and the upper clutch 35 is connected to the air return R. Hence the lower clutch 34 is actuated and the upper clutch 35 is deactuated.

The spool valve 32 is a four way, pilot operated, two position device of conventional design. As is well known the spool valve 32 operates on a pressure differential principal. Actuation of, for example, the control shaft 32d exhausts its associated pilot operator to atmosphere to thereby create a pressure differential within a poppet chamber (not shown) which causes the poppets (not shown) to shift. The spool valve 32 then assumes its second position and the poppets are locked until the other control shaft 32e is actuated. When the spool valve 32 assumes the second position, the upper clutch 35 is connected to the source, S, and the lower clutch 34 is connected to the return, R.

OPERATION

When the variable speed motor 12 is energized, the chain runs continuously in a clockwise direction at the speed set by the motor speed controllers (not shown). The carriage 24 is initially stationary. When compressed air, at 75 psi for example, is introduced into the inlet 32a of the spool valve 32, one of the two air clutches 34, 35 is actuated depending upon the initial condition of the spool valve 32. If the lower air clutch 34 is actuated, its piston 341 will slide along its hub 340b until the friction liner 342 engages the land 36a on the carriage chain sprocket 36. Before the liner 342 makes contact, the sprocket 36 idly spins with the motion of the chain 22. However, once the liner 342 fully abuts the sprocket land 36a, the sprocket 36 is no longer free to turn. Hence the sprocket 36, chain 22, and clutch 34 are effectively locked together. Since the clutch 34 is secured to the carriage 24, the carriage will move linearly in chain direction "A". (See FIG. 1) The carriage will move in direction "A" until the spool valve control shaft 32d encounters the left shock absorber 38 at which time the lower clutch 34 is deactuated and the upper clutch 35 is actuated. When pressurized air is supplied to the upper clutch 34, it locks or brakes its associated carriage sprocket 37 in the same manner and the carriage 24 then travels linearly in direction "B" until the right spool valve control shaft 32e encounters the right shock absorber 39. When contact is made, the direction on the carriage 24 is reversed and so on. In this manner the carriage 24 is caused to reciprocate until pressurized air is no longer supplied to the spool valve 32.

It is clear that both air clutches 34, 35 act as a brake. A unique design feature of the air clutch 34 is the absence of any biasing element which would act to return the clutch piston 341 to the unengaged position (shown in FIG. 2) when pressurized air is no longer supplied to the clutch 34. Through experimentation it was discovered that when pressurized air is removed from the clutch 34, the rotational movement of the freed sprocket 36, among other supposed things, creates enough force against the liner 342 and piston 341 to push these united elements away from the land 36a on the sprocket 36 so that they assume the unengaged position portrayed in FIG. 2.

I claim:
1. A fluid operated brake comprising:
a cylinder provided with
an axially extending hub,
two cylindrical bosses each of which extends parallel to said hub and each of which is radially spaced from said hub along a common diameter, and
a fluid port;
a cylindrical piston which is arranged to be carried by said
hub and said bosses and which is provided with
a central aperture through which said hub extends,
two cylindrical recesses each of which extends parallel to said aperture and each of which is radially spaced therefrom along a common diameter and into each of which a respective one of said bosses extends,
a first annular groove radially spaced a first distance from said aperture, and
a second annular groove radially spaced a second distance from said aperture;
a first annular fluid seal within said first annular groove which seal engages a surface of the hub and a surface of the piston;
a second annular fluid seal within said second annular groove which seal engages a surface of the cylinder and a surface of the piston; and
a friction liner secured to a surface of the piston.

* * * * *